July 13, 1954  C. L. BOWMAN ET AL  2,683,315
METHOD OF DRYING WET CONTAINERS
Filed March 3, 1950  6 Sheets-Sheet 1
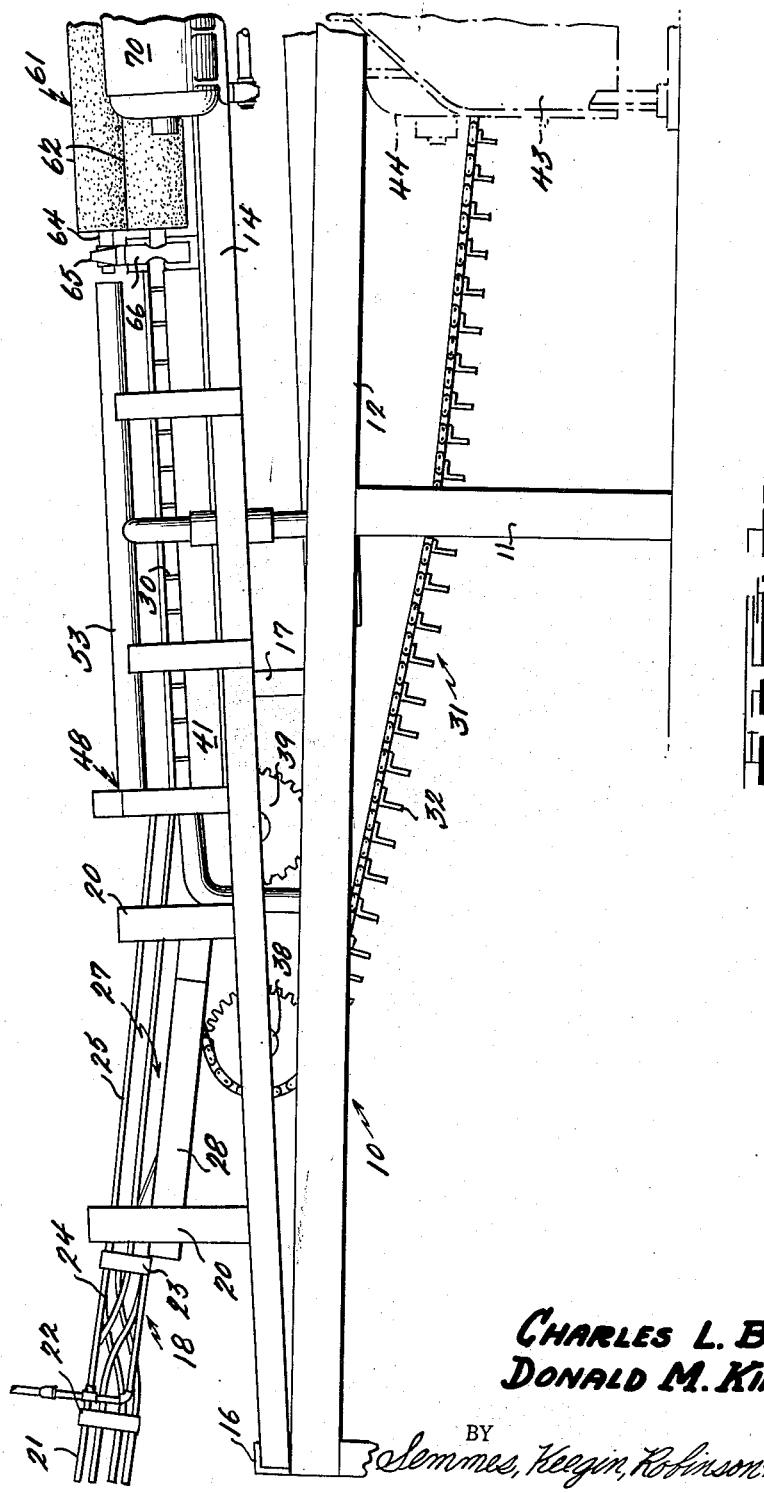
INVENTORS
CHARLES L. BOWMAN
DONALD M. KINGSFORD
BY
Semmes, Keegin, Robinson & Semmes
ATTORNEYS

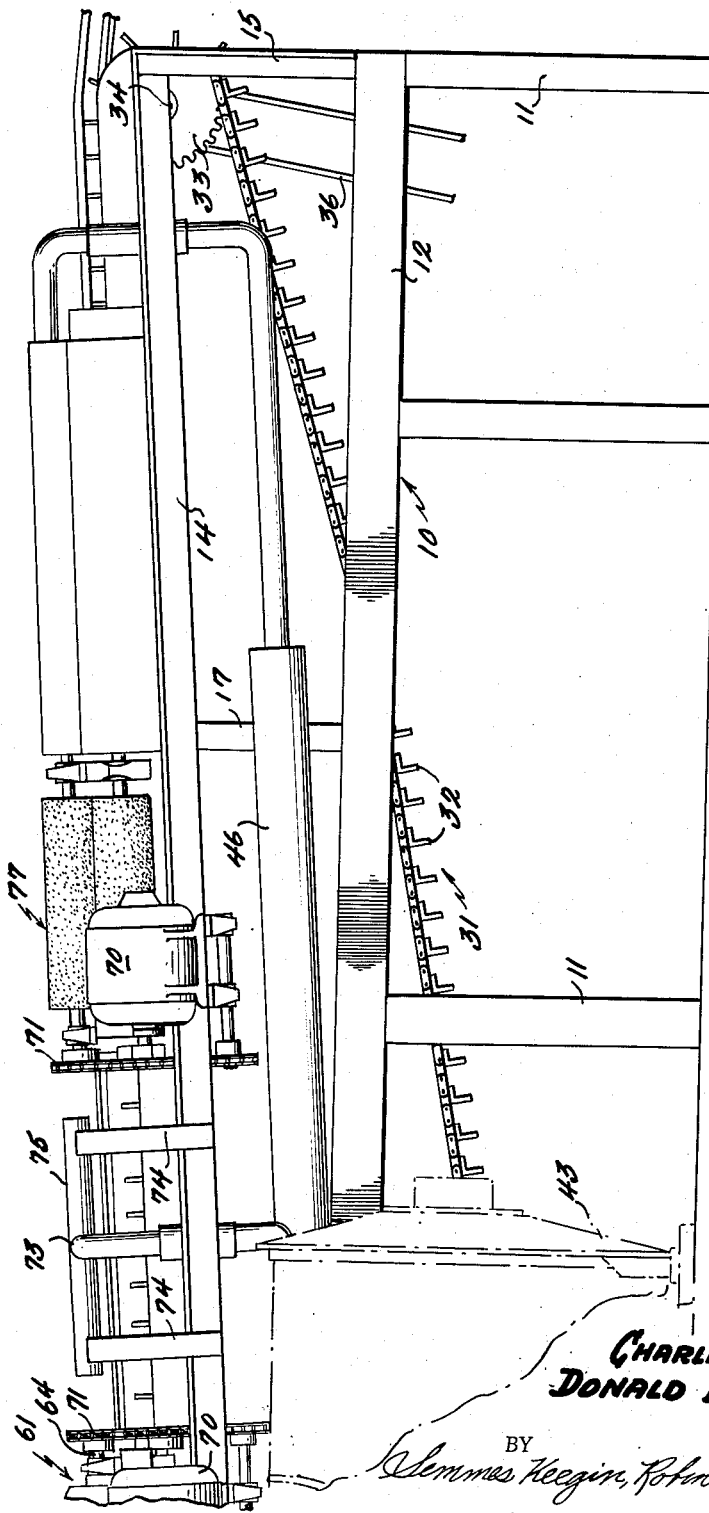

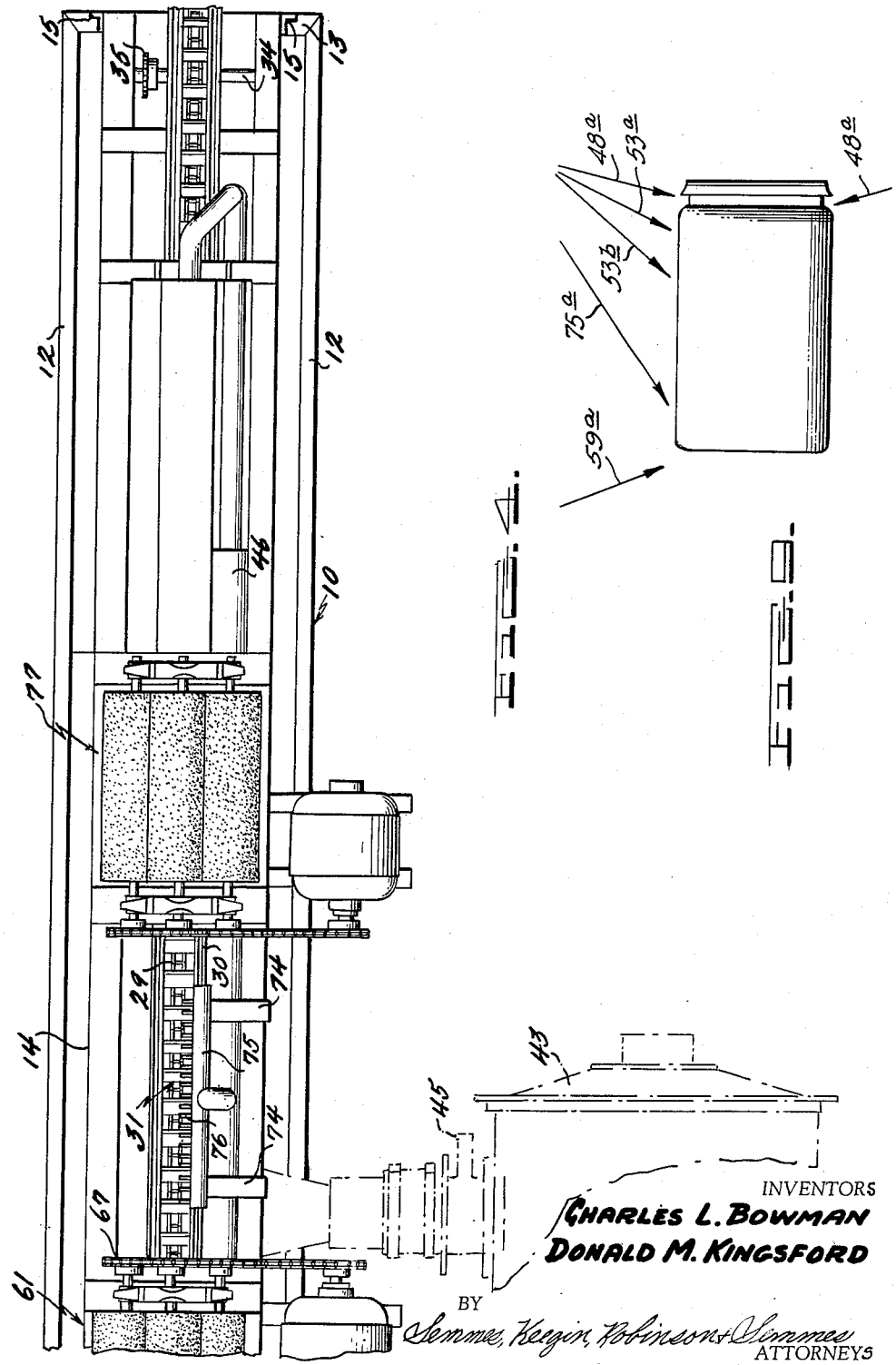

July 13, 1954
C. L. BOWMAN ET AL
2,683,315
METHOD OF DRYING WET CONTAINERS
Filed March 3, 1950
6 Sheets-Sheet 4
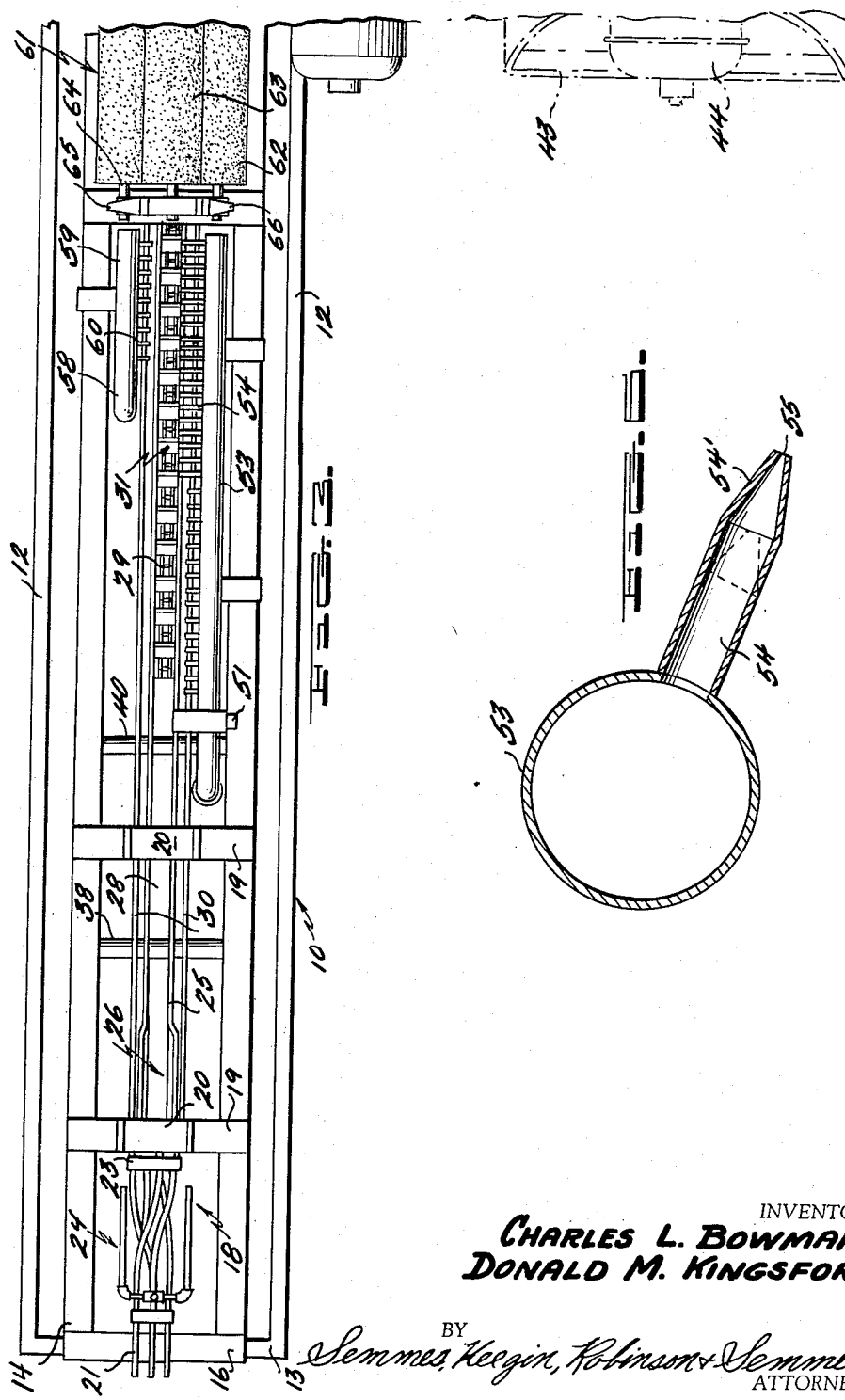
INVENTORS
CHARLES L. BOWMAN
DONALD M. KINGSFORD
BY
Semmes, Keegin, Robinson & Semmes
ATTORNEYS July 13, 1954　　C. L. BOWMAN ET AL　　2,683,315
METHOD OF DRYING WET CONTAINERS
Filed March 3, 1950　　6 Sheets-Sheet 5
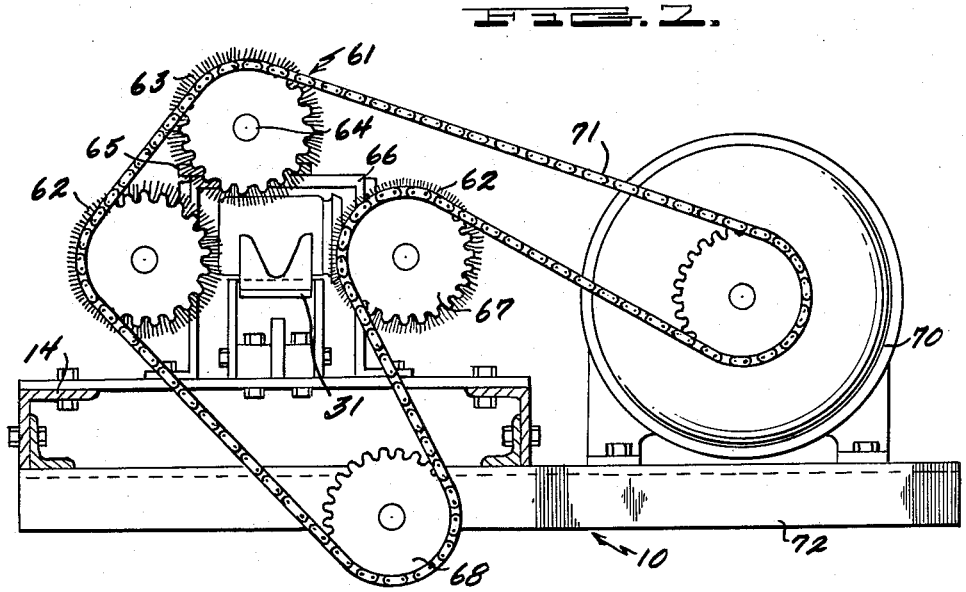
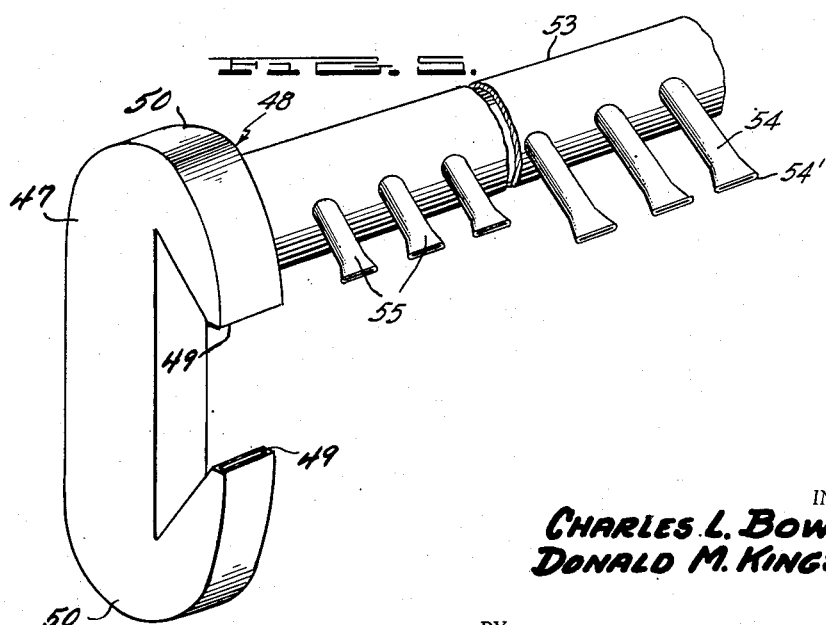
INVENTORS
*Charles L. Bowman*
*Donald M. Kingsford*
BY
*Semmes, Keegin, Robinson & Semmes*
ATTORNEYS

FIG. 8.

```
┌─────────────────────────────────┐
│    CONTAINER   RINSING          │
└─────────────────────────────────┘
              │
┌─────────────────────────────────┐
│          CONTAINER              │
│    GATHERING & ADVANCING        │
└─────────────────────────────────┘
              │
┌─────────────────────────────────┐
│ INITIAL PRESSURE BLASTING TOWARD│
│    CONTAINER CAP JUNCTION       │
└─────────────────────────────────┘
              │
┌─────────────────────────────────┐
│ INTERMEDIATE PRESSURE BLASTING  │
│ STAGE TOWARD CYLINDRICAL PORTION│
│ OF CONTAINER ——— 3 PHASES       │
└─────────────────────────────────┘
              │
┌─────────────────────────────────┐
│  SUPPLEMENTARY FILM BRUSHING STEP│
└─────────────────────────────────┘
              │
┌─────────────────────────────────┐
│ FINAL PRESSURE BLASTING TOWARD  │
│ ANNULAR BASE PORTION OF THE     │
│           CONTAINER             │
└─────────────────────────────────┘
              │
┌─────────────────────────────────┐
│   FINAL FILM BRUSHING STEP      │
└─────────────────────────────────┘
```

INVENTORS
CHARLES L. BOWMAN
DONALD M. KINGSFORD
BY
ATTORNEYS

Patented July 13, 1954

2,683,315

UNITED STATES PATENT OFFICE 2,683,315

METHOD OF DRYING WET CONTAINERS

Charles L. Bowman and Donald M. Kingsford, Fremont, Mich., assignors to Gerber Products Company, Fremont, Mich., a corporation of Michigan Application March 3, 1950, Serial No. 147,512

7 Claims. (Cl. 34—12)

This invention relates to a method of drying wet containers and has particular reference to operations as applied to cylindrical containers having smooth fluid adhesive surfaces, wherein the containers may be advanced from one point through the steps comprising the method to another point to complete the method of operation.

Methods for drying containers through adoption of conveying instruments used in conjunction with drying apparatus is well known. Heretofore, the methods employed in the desired operation have been inordinately costly due to the excessive amount of energy required to operate cumbersome and inefficient apparatus. Previously, methods of removing cleansing fluids from capped container articles have been impractical in that extremely high pressure blasts were required to have been directed to the containers to thoroughly remove adhering fluids therefrom. Furthermore, the art has demanded application of extreme heat to containers with the result that danger to cleansing machine operators and/or damage to content of containers follows. The directing of a mild warming and evaporative flow of air is contemplated herein, however. It has further perplexed industries which are canning and bottling foods and other like goods that they lack facility to produce clean containers suitable for labelling and display at a rate commensurate with the consumer demand.

With the foregoing deficiencies in the prior art in mind, it is an object of this invention to perform complete drying functions on wet cylindrical containers utilizing the simplest forms of apparatus, to conduct the entire function within minimal space and time requirements.

It is a further object of this invention to perform the entire container cleansing, drying and polishing function through employment of a single source of air pressure acting cooperatively with mechanical means actuable through a single source of energy.

Yet another object of the invention is to provide a method for drying wet cylindrical containers wherein coordination between a pneumatic blast step directed to remove excessive fluid accumulations from the containers, and a brushing step, directed to removal of film residue are sufficient to complement one another and to effectively carry out the desired drying function.

Still a further object of the invention is to define a method whereby fluids are progressively pneumatically ejected from all surfaces of rolling containers, the steps comprising the method being in complementary sequence.

With a view toward attaining the foregoing objects and others which may be apparent through reference to the ensuing description, drawings and claims appended hereto, a brief description of the general nature of the invention is hereinafter set forth.

In general, there is provided means for the gravitational passage of containers through a predetermined path defined by means for cleansing the container surfaces as they pass the cleansing operating station. By this method, in order that the containers may be thoroughly dried following cleansing, it is preferred to gather the same in spaced relation, each to the other and to advance the same along a selected course following the first mentioned cleansing course through operating stations in the method. Upon advancement through the several stations adapted to perform the steps of the invention, the containers are advanced rotatably with respect to the stations. During the rotatable passage of the containers therethrough, the stations established along the path perform complementary fluid removal functions. At a first station, for instance, pneumatic blast is directed toward the junction of cap portions of containers and cylindrical walls thereof. In this first station there are pre-arranged other operating elements designed to direct pneumatic blast toward succeeding portions of the container outwardly toward the base thereof and also downwardly across the base and away.

Immediately following passage of the containers through the first station they are carried through a second station adapted to remove film accumulations of cleansing fluids from the containers after breaking the film. It is preferred to have brushes disposed longitudinally with relation to the path defined thereby to impinge upon the exterior surfaces of containers to carry out the function. The particular arrangement of the performance stations is critical to the invention in that each initial step carried out requires the complementary action of the succeeding step.

The inherent operational nature of the aforementioned second station is such as to develop accumulations of fluid on certain portions of the containers passing therethrough, which accumulations may be readily removed upon application of a complementary flow of pneumatic pressure against the particular accumulative portions of the containers.

Succeeding the above steps is the application of brushing to containers to a high luster and warming thereof previous to labelling operations.

The entire operation may be conducted efficiently only through the complementary coordination of the pneumatic and brushing elements taken in conjunction with the method of advancement of the containers therethrough.

In the drawings:

Figure 1 is a view in side elevation of forward elements of a type of apparatus which may be employed in the method.

Figure 2 is a view in side elevation of rearward elements of a type of apparatus of the invention taken along the same continuous line of the elements shown in Figure 1.

Figure 3 is a top plan view of the forward elements of a type of apparatus which may be employed in the present method invention.

Figure 4 is a top plan view of a type of apparatus employed in the invention showing the rearward elements of a type of apparatus adaptable to the present method invention taken along a continuous line from the elements shown in Figure 3.

Figure 5 is a view in perspective of two basic manifolds adapted to remove fluids from containers.

Figure 6 is a horizontal cross sectional view of a typical manifold structure adaptable to the method.

Figure 7 is a view in vertical cross-section of a brush assembly at station 2 showing the interconnection between the brushing elements and the method of drive thereof.

Figure 8 is a chart outlining the complementary steps in the invention.

Figure 9 is a schematic drawing illustrating the paths of flow of the container drying devices.

In order that the method of drying cylindrical containers may be conducted, it is believed helpful to understand the arrangement of parts which may be used in the application of the method. To facilitate appreciation of the method, there is hereinafter described in specific detail a type of apparatus such as is described in copending application Serial No. 134,236 which may be used to carry out the operations claimed.

A preferred rectangular structure 10 is shown to rest on vertical legs 11 disposed longitudinally thereof and at the four corners of the rectangular frame structure. Extending longitudinally of the rectangle are a pair of beams 12 secured to the legs 11. A pair of transverse beams 13 is secured to the extensions of beams 12 and likewise to the four legs 11 as by nut and bolt attachment. The beams 12 and 13 provide a base for the inclined frame structure on which the working elements of the washing and drying device are supported. An inclined frame 14 is supported by the base 10 at one longitudinal extremity as by the adjustable supports 15, and at the other by a hinge 16 extending transversely of the frame and attached to lower transverse beam 13 by welding or other suitable means. Four or more vertical supports 17 which support the center portions of inclined frame 14 derive support from attachment to the longitudinal beam 12 of the base.

Ramp 18 may be inclined oppositely from the frame structure 14 and is adjoined thereto at a horizontal distance equivalent to the base of a right angle formed by the ramp. Upon introduction of upright cylindrical containers into the device at the mouth of this ramp, introductory conveyor action forces the containers longitudinally of the device to working elements of the invention. The vertical ramp supports 20 are of inverted U-shaped structure, having extensions which rest upon cross members 19. Each cross member is secured to inclined frame 14. A series of guide rails 21 disposed in rectangular position comprise the introductory channel for containers. These rails generally are six in number, and include container base, cap and twin wall guides. See Figures 1 and 3.

At suitable intervals along the guide rail frame structure a series of rectangular brackets 22 and 23 serve to maintain the guide rails in uniform spaced relation to each other. Peculiar to the invention, however, is the position in which the guide rails are maintained. Twisting of the fixedly spaced guide rails from vertical to horizontal provides a channel which may permit the gravitational movement of containers from normal to lateral position. Such channelling is important to over-all cleansing of containers. Twin series of parallel cleansing fluid jets 24 are placed in juxtaposition to the section of introductory ramp lying between vertical and horizontal brackets 22 and 23. Support for these jets may be obtained from either ramp or exterior introductory piping brackets.

Guide rails originally disposed at vertical side portions of the channel may, following twisting travel, provide channel roof and lower rail sections for the lateral rotational movement of containers. At a suitable distance from container axis converter and bracket 23, guide rails 25 are spread laterally of one another to provide an exit opening 26 suitable for the passage of misplaced containers, the axes of which are in alignment with the path formed by the ramp guide.

An auxiliary ramp 27 is provided immediately beneath the aforementioned spaced portion of the trackage and secured thereto. This ramp is of greater declination than that of the introductory ramp. The auxiliary ramp provides for the sliding removal of misplaced containers and gathering of the same into a container receptacle 28 from which the misplaced items may be withdrawn and reinserted into the device.

As shown in Figure 1, the inclined ramp structure terminates course at approximately one-fifth the distance upward the inclined frame 14. Rails 29 and 30 continue the course inwardly of frame 14. In order that containers may be further advanced longitudinally of the device, an endless conveyor 31 is provided having spaced plate projections 32 secured about the endless conveyor. The conveyor is of sufficient length to allow travel over four-fifths of the length of the machine and to gather the containers prior to termination of course through the introductory ramp. The conveyor may be motivated through any suitable actuating means having a reduction gear unit contained therein to drive a sprocket as at 33, the said sprocket having keyed attachment with axle 34. A drive linkage 36 is adapted to engage a gear 35 which is likewise in keyed attachment to the axle 34. This driving mechanism is attached at the furthermost extremity of the frame structure and bears in the inclined longitudinal frame 14.

Toward the downward extremity of the inclined frame structure and having bearing therein, an idler 37 is provided for the supported continuation of passage of the conveyor element. Idler unit 37 is secured to an axle 38 which bears in the inclined ramp 14.

As in Figure 1, a timer unit 39, axially mounted forward of the idler element at 40 and at a point substantially adjacent to the point of convergence of the introductory ramp 24 and the inclined frame structure 14, raises the unsupported section of the conveyor 31. This timing unit is so carefully placed that the conveyor chain may be lifted upwardly from the idler element onto a guide 29 whereon the conveyor may slidably ride throughout its working course. The timing element likewise pulls the spaced plate projections 32 gradually upward so that each projection may engage a portion of a container wall. The unsupported portion of the chain acts as a resilient cushion for containers being gathered from the ramp prior to placement on guides 29. Pusher plate projections 32 are spaced sufficiently to prevent jamming of containers, and further sufficiently to enable rotation of the same throughout the remainder of the course on guides 41.

In the invention it is essential that containers advance rotationally with respect to the working elements of the machine. This phenomenon is especially pertinent when it is realized that a thorough drying, brushing and polishing operation must be effected prior to the ejection of the containers from the device. Thus, spaced projections 32 may be made generally L-shaped, the bases thereof being of width substantially greater than the conveyor. Width of the projections must be at least two-thirds over-all length of containers. Shorter width would cause misplacement. Furthermore, the planular surface of the projections has a V-shaped aperture to enable exposure of cylindrical walls of containers as they roll.

Several of the operational elements of the device include pneumatic manifolds which necessarily demand a source of air flow. A conventional turbo compressor is illustrated in the drawings as at 43, including an electric motor 44. For purposes of regulating the flow of compressed air, a valve 45 is affixed to an exhaust manifold of the compressor. From the exhaust manifold there extends longitudinally of the frame a compressed air conductor 46 from which the various ducts of the device emanate.

Immediately forward of the timing element of the conveyor and attached to the inclined portion of the frame structure a U-shaped manifold 48 is shown having outlets 49 extending upwardly and downwardly of support rails 29 and cap and base guide 30 at the extremities of arms 50. Figures 1, 3, and 5 illustrate the structure. Each of the outlets is directed toward a portion of a guide rail 41 which provides for bearing of sealing elements of duct 47, through outlets 49, toward the irregular surfaces found at the junction of the cylindrical wall and cap element of containers. Where sufficient width to vents 49 is provided, the removal of accumulations of cleansing fluid from junction of sealing cap and container wall may be physically effected with minimal pressures considering the rotation of the containers during their advance in the machine. Furthermore, the simultaneous blast effect of upper and lower vents on the rotating neck surfaces of containers assures effective fluid removal. This manifold 48 is secured to the frame structure by support bracket 51 as by welding engagement to the frame 14 and the feeder. Duct 47 emanates from conductor 46.

A major portion of fluid having been removed from the neck of a container through a first pneumatic blast, the cooperative disposition of the second manifold jets is important. Longitudinal manifold 53 being of general tubular configuration is affixed to the aforementioned manifold 48 and is directly in line with the course of travel of the conveyor in guide 41. Tubular jets 54 are welded to the tubular manifold structure at acute angles to the path of travel of containers, the said manifold having two sections of jets whereon the first section contains jets which are shorter than the second section. The object in varying lengths of the jets is to provide compressed air contact with successive portions of cylindrical surfaces of containers and to gradually dispose of fluids which adhere to those surfaces. Closing of apertures 55 of jets 54 to narrow the same assures breadth of blast which will enable uniform coverage to a maximum of cylindrical surface of containers. Furthermore, this series of jets is peculiarly designed to cooperate with the aforementioned blasting of the irregular surfaces of the caps of the containers, to augment original blast forcing of fluid from container necks. Construction of the jet and manifold is best shown in Figure 6. Partial closing and widening of jets 54 is shown as at 54′.

A duct 58 emanates from the conduit 46 to supply manifold 59, which manifold faces oppositely to the aforementioned tubular manifold 53 and is in line therewith. This latter manifold carries a plurality of tubular jets 60, each of which is of shortened length compared to jets of manifold 53 and subtends an angle substantially more acute than the aforementioned. This third manifold structure is utilized to remove accumulations of fluid from bases of jars subsequent to the first indicated film removing means. As in the positioning of each of the other manifolds, the disposition of manifold 59 is critical, being directly proportionate to efficiency of operation. The angular relation of jets of manifold 59 is likewise critical.

Although the previously described manifolds are designed to contact the fluid at critical points along the surfaces of containers and to move the same along the surfaces to point of extremity, the particular arrangement is not adapted to effect the complete removal, for accumulations will develop at the curvilinear extremity of the base as well as at the extremities of the circular cap and other surfaces. Due to tendency of fluids to adhere to smooth surfaces of glass, plastic, and metal containers, the total removal becomes difficult in the absence of extreme and costly air pressures. To augment the removal of these excessive accumulations including remaining films, the invention includes a brush assembly comprising a series of rotatable brushes, the axis of each of which is in line with axis of advance of the containers. See Figures 1, 3, and 7. The brush assembly is indicated as at 61 in the drawings, each of the separate brushes of the assembly being shown as at 62 and 63. The horizontal brushes 62 are adapted to effect removal of the excessive fluids from the caps and bases of containers, each of these brushes being arranged to move inwardly toward the path of movement of the containers.

The brush 63 may be rotated from top to bottom of the jar as it rotates in the path of movement of the conveyor. The axles 64 of the brushes are shown to bear in bearings 65 displaced in triangular relation over the path of advance of the conveyor. Each of the bearings 65 is secured to an inverted bracket 66, which bracket provides a triangular or preferably U-shaped opening for the passage of the containers therethrough. The brackets 66 are mounted along the base of cross members similar to those shown as at 19, which cross members are secured to the inclined frame members 14. At one extremity of each of the axles 64 a series of sprockets 67 is secured through keyed engagement to axles. Actuation of the brushes may be effected through connection between sprocket and motor 70. The particular arrangement of interconnection between the sprockets and the power source is specifically shown in Figure 7. Here is shown a chain wound about a driving sprocket 69 of the source 70 and over the sprocket 67 of each of the brushes. In order that this particular arrangement may be effected, an idler sprocket 68 is borne under the working surface of the conveyor and brush elements. This idler sprocket 68 provides a path for the chain element 71 under the total arrangement of working parts so that over-all rotation of the elements may be accomplished in the particular manner aforementioned without interference to conveyance of containers. The idler 68 has bearing in cross members 72. The two cross members 72 are secured to the inclined frame structure beneath the guides and working elements and these members form a base for the motor.

The operation of the aforementioned brush assembly is sufficient to effect a complete removal of fluid particles from those surfaces with which it has contact. It is insufficient, however, to complete the removal of fluids from all surfaces since there is normally a dead area as at the curved portion of the base of containers whereon droplets remain due to the actuation of top brushes. The top brush of this first series is preferably offset toward the portion of the guide 41 which bears neck portions of containers. Brushes of the assembly strike surfaces of the containers tangentially and eject fluids in a like manner. The dead area lies upon containers between the top cylindrical wall brush and the base brush. Accumulations resulting from tangential ejection effect may be removed through the cooperative positioning of a manifold 75, shown in Figures 2 and 4. Similar to the aforementioned manifolds and jets attached thereto, this manifold 75 has a series of jets 76, each of which cooperates with the other to impart pneumatic blast downwardly to that portion of the containers which is not sufficiently dried by the aforementioned operations, designated as the curvilinear surface. Pneumatic supply to the particular system is channeled through duct 73 emanating from the pneumatic air source 43 through the manifold 46. Support to this entire pneumatic blasting means is derived through the adaptation of the supporting elements 74 which may be secured to the frame structure as by welding or through any other suitable securing means.

It is pertinent to the invention to have all manifold elements and the brushing assemblies placed substantially close in the path so that air drying of the fluids from the containers does not occur otherwise than as provided through the ejection of compressed air from manifolds and jet elements. If the films of fluid on the exterior surfaces of the containers be allowed to dry through normal atmospheric pressure, accumulations of cleansing particles would remain on the containers rendering impossible efficient polishing of the same to any suitable degree. For the aforementioned reason, therefore, the specific arrangement shown has been proved through experimentation and use to be of the utmost efficiency in operation.

Shown in Figures 2 and 4 as in line with the conveyor path and other working elements thereon, a second series of brushes is received. This series of brushes is indicated as at 77, each of the brushes being actuated in a like manner to the aforementioned series of brushes and each being mounted in a similar manner. These elements are shown numbered similarly to the aforementioned first series of brushes. Unlike the aforementioned series, however, the top brushing element 63 is slightly offset toward the base of the jar to particularly assure polishing thereof.

The brushes utilized are of peculiar construction commensurate with maximum efficiency of operation in the machine. They are preferably spiral wound having nylon bristles which are non-absorbent, adapted to wipe the fluid from the surfaces of the containers and to remove the fluid from the bristles of the brush by centrifugal action, ejecting the fluid from the bristles outwardly into the atmosphere, thereby maintaining the brushes in a state of relative dryness. This particular and peculiar action is important, for it is in this manner that the brushes are maintained in a state of utility and that the necessity for exchanging, drying and maintaining the same is minimized.

The device is constructed to thoroughly cleanse, dry and polish from 600 to 1000 containers per minute, the entire operation being conducted without necessity for intervention of human manipulation other than timing of the motivating mechanism. Containers having been subjected to a relatively thorough washing operation, they may be moved forwardly toward the invention through belt movement from a washing tank. One extremity of a belt may be positioned to ride just under the opening of the introductory ramp channel formed by the guides 21. Due to the inclined attachment of this introductory ramp, containers slidably entering the ramp standing on their bases, may be moved downwardly thereof.

Due to the peculiar construction of the segment section of the ramp between the brackets 22 and 23, containers entering the device in upright position are gradually shifted so that were an axis drawn through the center of the cylinder formed by the container, it would be shifted from normal to horizontal position as the container passes through this section. This gradual shifting of the container is necessary in that a thorough cleansing operation may be thereby effected. Jets of cleansing solutions such as a hot soft water fluid may be injected through the parallel fluid injectors 24 upon all surfaces of the containers.

Any containers which are introduced other than upright pass through the aforementioned section of the introductory ramp and upon passage through this first section of the ramp may be withdrawn upon entrance into the spread portion of the trackage 25 as at entrance 26. Endwise containers will fall through the exit formed by the spread portion of trackage 26 downwardly and will slidably engage a ramp which is designed to move these containers away from the path of movement of the other containers so that the misplaced container may be thereafter replaced in the forward portion of the ramp in an upright position.

Other containers correctly spaced are forcedly moved downwardly of the ramp, each against the other until they arrive at a point just short of junction of the introductory ramp and opposed inclined frame 14. As indicated, gathering of the containers for advancement forwardly of the device is effected between the idler 37 and timing idler 39 of the conveyor structure. While the containers are yet on the introductory ramp, they are cushioned through the resilient action of the unsupported section of the conveyor which lies between idlers 37 and 39 to the extent that the pusher plates 32 will engage the cylindrical walls of the several containers in spaced relation, thereby setting them for rotatable advancement. Having been thoroughly gathered adjacent the timing section, the containers are shifted to the path formed by trackage 41 so that they may retain rolling engagement therewith. Pusher plates of the conveyor are maintained in upright position by guides 44 which guides provide a track for the rotatable advance of containers. The maintenance of this rolling action is important, for it is through this rotary action of the containers that complete effect of the working instruments of the device may be carried into operation.

The removal of accumulations of cleansing fluid from the junction of sealing caps of containers and container walls presents a particularly difficult problem. For this reason the pneumatic manifold shown as at 48 has opposed vents directed downwardly and upwardly of the path defined by guide trackage 41. The vents are turned upon the point at which junctions of cap and containers roll past. It has been found that relatively low compression of air through the manifold and vents will be sufficient to effectively remove accumulations from that section of the containers rotating beneath the vents. If these accumulations were to remain under the surfaces adjacent the overhanging cap portions of containers, they would fall upon removal and upright positioning of the containers, thereby leaving undesirable fluids and cleansing salts and dirt on the surfaces thereof, other drying operations and polishing operations having been conducted.

As the containers are advanced longitudinally of the structure through the actuation of the conveyor element, there are rotated beneath blasts of air from the graduated jets of manifold structure 53. As has been indicated before, these jets are peculiarly designed to remove the fluid from the neck of the containers outwardly toward the base thereof; each of the jets having its outlet extremity tapered to form a narrow orifice for the extrusion of compressed air against a maximum of moving cylindrical surfaces of the containers. The construction of the jets is such that maximum compression will occur at point of extension. Passage of containers under this longitudinal manifold and jets attached thereto will shift the film of fluid toward the base, which film may be further removed through operation of an oppositely positioned manifold 59. This cooperation between manifolds is essential to operation and wholly dependent upon positioning of the elements. Referring to Figure 9 of the drawings there is shown a side view of a typical container toward which drying streams of air are directed. Number 48a refers schematically to the flows emanating from manifold 48; numbers 53a and 53b the flows directed sequentially from manifold 53; number 75a the flow from manifold 75; and 59a the flow from manifold 59. The cooperative disposition of the respective flows is best appreciated upon reference to the aforementioned disclosure of operation. Briefly flows 48a, 53a, 53b, and 59a are disposed for complementary action and flow 75a is adapted to enhance the initial brushing operation.

The jets 60 of manifold 59 are directed to the base portions of containers. These jets extrude compressed air against the bases to slough off the excess fluid accumulations. The positioning of this instrument is critical to the operation, for the effect of removal would be minimized, should this element not be disposed to function following other compressed air operations.

Due to the inherent adherent nature of cleansing fluids, it is difficult to completely remove all the fluids from the containers without developing extreme pressures of air; rather certain accumulations will normally remain following the above operation. It has been found ineffectual and somewhat dangerous to subject the containers to heat which would sufficiently remove all fluid content from containers, and for this reason several series of brushing elements have been incorporated in the device to carry out the function. As the containers are rotated forwardly from the pneumatic fluid removing means, they are immediately subjected to a brushing operation whereon excessive accumulations of fluids not removed in the first phase of operation are simultaneously removed from cap, base and cylindrical wall portions through the tangential application of rotating brushes to the respective surfaces. The brushes being preferably of spiral wound non-absorbent nylon bristles, such as eject the accumulations of fluids upon the bristle surfaces thereby avoiding continued replacement of brushes which are dried. Operation of the brushes, therefore, serves to not only remove excessive water accumulations from surfaces of containers, but also to cleanse the brushes, for continued operation throughout long periods of time.

The positioning of the brushes is particularly important, for if substantial distance exists between the brushing and pneumatic elements, it is possible that air drying of the excessive accumulations of cleansing fluids would result, thus leaving a residue of cleansing fluids and particles of dirt on the container surfaces. If placed as described, the brushing units are directed to dry those container portions normally retaining films of fluid following the pneumatic operations mentioned.

The advantage of this particular arrangement is likewise considered in the positioning of the pneumatic manifold 74. Due to the inherent configuration of certain containers, it is impossible for all of the brushing surfaces of the brushes to reach curvilinear surfaces of the rotating containers. For this reason the proximity of manifold 74 to the first brush assembly is important, for the thinnest films of fluid should be removed prior to normal evaporation. Direction of the various jets 76 of manifold 74 to the curvilinear portions of the rotating conveyors and application of compressed air thereto will effect removal of those accumulations which develop from the aforementioned brushing operation wherein the dead space between upper and lower brush accumulates droplets. As the positioning of brushes must of practical necessity proximate the first series of pneumatic manifolds, so the positioning of the fourth manifold must proximate positioning of the first-mentioned brushing series.

Containers are thereafter passed through a second brushing assembly wherein they are polished to a high luster, each of the brushes of this series being arranged in triangular formation about the guide 41 to impart polishing to all three main surfaces of the container. The uppermost brush 63, however, is displaced slightly to one side of the path of movement of the containers so that the curvilinear portion of the containers may be polished.

Peculiar to the invention is the specific method of coordinately employing pneumatic pressure and brushing means complementary each to the other. Likewise peculiar and necessary to the complete functioning of the method is the manner in which the containers are advanced or passed through the several stations performing the desired cooperative and complementary functions.

It is to be noted that the employment of the specific apparatus defined in this invention is not binding, but rather that the desired functions may be carried out through the employment of any other apparatus having similarly disposed elements coordinately arranged each to the other. The method employed in the invention is to be considered limited only as defined in the appended claims and not solely in the light of the foregoing description.

We claim:

1. A method for drying wet containers having detachable caps and fluid adhesive surfaces comprising rotatably advancing the containers on their sides along a path defined by fluid removal stations, directing an initial flow of compressed air through opposed outlets against the junction of cap and container and subsequently directing other flows of compressed air against cylindrical and base surfaces of the containers at a first station, all said flows being directed complementary to one another and thereby removing excess fluids from the containers, and brushing the containers at a second station complementary to the first to remove remaining films of fluid accumulations from the containers.

2. In a method of drying wet cylindrical containers the steps comprising spacing and advancing containers rotatably on their sides by open walled conveyor projection engagement along a path defined by stations; directing pneumatic pressures consecutively at a first station through opposed outlets initially normal to junction of container and container cap and subsequently inclined against container cylindrical surface portions from top to base of each container, thereupon consecutively directing pneumatic pressures across base portions of containers to remove excess accumulations of fluid from containers passing through said first station; brushing containers immediately following advancement through said first station at a second station to break and eject films of fluid adhering to the said containers.

3. In a method of drying wet cylindrical containers the steps comprising spacing and advancing containers rotatably on their sides along a path defined by stations, directing pneumatic pressures consecutively at a first station through opposed outlets initially normal to junction of container and cap, and subsequently inclined against container cylinder surface portions and from junction of container cap and flange to bases of containers, thereupon and consecutively directing pneumatic pressures across base portions of containers to remove excess accumulations of fluid from containers passing through said first station; brushing containers immediately following advancement through said first station at a second station to break and eject films of fluid adhering to the said containers and caps of containers, said brushing being effected as through complementary action of counter-rotating brushes disposed for major container surfaces contact and consecutively blowing air at a third station against surfaces of containers accumulating fluids during brushing at the second station.

4. A method substantially as in claim 3 wherein containers are polished to a high luster through brushing action at a fourth station.

5. A method of drying wet cylindrical containers having detachable caps including drying rolling containers by means of the progressive steps of first directing opposed flows of compressed air against the junction of the rolling container flange and container cap, of secondly directing flows of compressed air angularly against the upper portions of cylindrical walled containers from the junction of container flange and container cap towards the bases of containers, of thirdly directing flows of compressed air angularly against lower portions of cylindrical walls of containers toward the bases of the containers, of fourthly directing flows of compressed air progressively angularly of residual accumulations formed on the bases of containers across bases of the said containers.

6. A method as defined in claim 5 including the additional step of progressively ejecting accumulations of fluid from caps of rolling containers by means of passing the containers longitudinally of a horizontally disposed inwardly rotating brush and of concurrently ejecting adhering accumulations from container walls and bases of rotating containers as by passing said container through a counter-rotating brushing station wherein all brushing elements are disposed axially parallel to the direction of passage of the containers.

7. A method according to claim 6 incorporating the further progressive step of forcing compressed air through a series of in-line jets angularly against the curvilinear periphery of rolling containers so that compressed air turbulences may be cast upon the periphery of the bases of containers and on the lower periphery of container walls to atomize and dispel moisture clinging to curvilinear base portions of the containers.

References Cited in the file of this patent

UNITED STATES PATENTS

| Number | Name | Date |
|---|---|---|
| 766,510 | Munn | Aug. 2, 1904 |
| 1,053,130 | Morral | Feb. 11, 1913 |
| 1,209,801 | Beckett | Dec. 26, 1916 |
| 1,415,258 | Nelson | May 9, 1922 |
| 1,529,651 | Eberhart | Mar. 17, 1925 |
| 1,700,994 | Buck | Feb. 5, 1929 |
| 2,132,303 | Lathrop | Oct. 4, 1938 |
| 2,133,481 | Schroeder | Oct. 18, 1938 |
| 2,501,367 | Wehmiller | Mar. 21, 1950 |